UNITED STATES PATENT OFFICE.

HANS A. FRASCH, OF NEW YORK, N. Y.

PROCESS OF MAKING STARCH.

SPECIFICATION forming part of Letters Patent No. 717,184, dated December 30, 1902.

Application filed June 5, 1902. Serial No. 110,352. (No specimens.)

*To all whom it may concern:*

Be it known that I, HANS A. FRASCH, a citizen of the United States, residing at New York, in the county of New York and State of New York, have invented a certain new and useful Improvement in the Manufacture of Starch and Its By-Products, of which the following is a full, clear, and exact description.

In the manufacture of starch and similar products it is important that the starch granules contained in a substance should be separated from each other and from the cellular membrane in which they are embedded by nature, so as to allow the starch substance to be liberated and floated off from the intercellular substance. This is now accomplished, especially when cereals, such as Indian corn, are treated, by means of chemicals which act as a solvent upon the intercellular substance. The treatment with chemicals, however, affects not only the cellular membrane, but also the starch itself to a greater or less extent and diminishes the yield of starch, either because of insufficient action upon the cellular substance or too strong action upon the starch. In the first instance insufficient treatment does not completely expose or liberate the starch granules, and thereby renders unavailable a large portion of the starch, while in the second instance an excess of solvent causes a portion of starch to go into solution and be thereby lost. Besides, the starch becomes more or less contaminated with the chemicals, as does also the refuse, which latter on that account becomes a worthless by-product. To overcome these difficulties and render the use of chemicals unnecessary, or at least greatly reduce the quantity required and increase the yield of starch from any substance containing same, I destroy the cellular membranes inclosing the starch granules by the mechanical force exerted by freezing, and for this purpose I saturate the starch-bearing substances with water or other congealable fluid, if it does not already contain same in its natural state, and then submit it to a temperature below the freezing-point of the water or other fluid with which it is saturated, thereby opening or destroying the cellular membranes and liberating the starch without otherwise affecting the inclosed starch granules. By this method not only the starch is liberated, but also the oil-bearing germs, which, as in corn, form a valuable by-product, are freed.

In subjecting a substance, such as potatoes, bearing constitutionally water or other fluid to a temperature below the freezing-point of the aqueous fluid contained in the substance the solidification of the fluid destroys by expansion the membranes and cellular tissues, intermixing upon thawing the fluid and solid constituents of the substance, so that if the substance contains starch the starch granules upon further mechanical disintegration may be freed from the membrane, in which they were inclosed by nature, and can readily be floated off by water and separated by gravity from the cellular and intercellular substance.

Cereals and other substances containing starch but not enough water by nature to accomplish the destruction of their tissues by freezing, such as Indian corn, must first be steeped or soaked in water or other suitable fluid before they are subjected to the freezing process.

The freezing process can be accomplished by any of the well-known methods of refrigeration either before or after milling the substance to be operated on. It may be done by exposing the substances to cold air or by direct or indirect immersion in refrigerated salt brine or similar solutions.

To carry out my invention with such substances as Indian corn or other cereals containing starch, but little or no water, I soak the substance in water until it is thoroughly impregnated and will not absorb any more water when the excess of the water which has not been absorbed is removed. The soaked substance, charged with the water it has absorbed, is then subjected to a temperature below the freezing-point of water until all the water contained therein has been transformed into ice, when it is removed to a temperature above the melting-point of ice and is allowed to thaw. The substance thus soaked, frozen, and thawed is then milled and subjected to the ordinary and well-known methods of separating the starch. If corn be operated on by this process, not only the starch but also the oil-bearing germs of the corn are loosened from the body of the corn, and upon milling these may be collected and utilized for the production of corn-oil in the ordinary manner.

Besides the advantages gained by this method of obtaining the starch and germs in their natural state without the detrimental contamination of chemicals the residual fibrous pulp, which where chemicals have been used is a worthless refuse, becomes by my process a valuable by-product suitable for animal-food. It is, however, not absolutely necessary to subject the corn or other starch-bearing substance to freezing before milling the same, since results can also be accomplished by first milling the substance in presence of water or not, as the case may be, and then freezing the pulp. Also the corn or other starch-bearing substance may be subjected to chemical treatment before or after the freezing process, or the water in which the corn is soaked may contain chemicals, and the action of the freezing process remains the same.

What I claim is—

1. In the manufacture of starch and similar products, subjecting the starch-bearing substance, in the presence of water, to a temperature low enough to freeze the water, thawing it, and then separating the starch from the cellular tissues and intercellular membranes, substantially as described.

2. In the manufacture of starch and similar products, from cereals, dismembering the cellular tissues and intercellular membranes of such cereals, by soaking the cereals in a congealable fluid and exposing such soaked cereals to a temperature below the freezing-point of the fluid they have absorbed, thereby destroying the cellular membranous constituents of the cereals, substantially as described.

3. The process of manufacturing starch and similar products, consisting in subjecting a starch-bearing substance in presence of a fluid capable of freezing, to a temperature equal to or below the freezing-point of the said fluid, exposing the frozen substance to a temperature above the melting-point of the frozen fluid and thereby thawing it, and thereafter separating the starch, substantially as described.

4. The process of making starch and by-products from corn, consisting in soaking the corn in a congealable fluid, freezing such soaked corn, and thawing it and thereby dismembering the starch-cells, before subjecting it to the process of separating the starch and oil-bearing germs, substantially as described.

In testimony whereof I have hereunto set my hand this 3d day of June, A. D. 1902.

HANS A. FRASCH.

Witnesses:
WM. H. FINCKEL,
C. A. NEALE.